(12) United States Patent
Ichikawa et al.

(10) Patent No.: US 9,172,276 B2
(45) Date of Patent: Oct. 27, 2015

(54) POWER TRANSMISSION DEVICE AND POWER TRANSFER SYSTEM

(75) Inventors: Keiichi Ichikawa, Nagaokakyo (JP); Henri Bondar, Kyoto (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 729 days.

(21) Appl. No.: 13/568,505

(22) Filed: Aug. 7, 2012

(65) Prior Publication Data
US 2012/0299397 A1 Nov. 29, 2012

Related U.S. Application Data

(63) Continuation of application No. PCT/JP2011/002663, filed on May 13, 2011.

(51) Int. Cl.
*H02J 17/00* (2006.01)
*H02J 5/00* (2006.01)
*H01B 7/30* (2006.01)

(52) U.S. Cl.
CPC .. *H02J 17/00* (2013.01); *H02J 5/00* (2013.01)

(58) Field of Classification Search
USPC .......................................................... 307/147
See application file for complete search history.

(56) References Cited

U.S. PATENT DOCUMENTS

| 7,778,561 | B2 | 8/2010 | Adachi |
| 2009/0003860 | A1 | 1/2009 | Adachi |
| 2009/0206675 | A1 | 8/2009 | Camurati et al. |
| 2009/0302690 | A1 | 12/2009 | Kubono et al. |

FOREIGN PATENT DOCUMENTS

| CN | 2694287 Y | 4/2005 |
| CN | 101334618 A | 12/2008 |
| FR | 2875649 A1 | 3/2006 |
| JP | 9-312942 A | 12/1997 |
| JP | 2009-531009 A | 8/2009 |
| JP | 2009-296857 A | 12/2009 |
| JP | 2010-150316 A | 7/2010 |
| JP | 2010-213554 A | 9/2010 |
| JP | 2010-537613 A | 12/2010 |
| WO | WO-2007-107642 A1 | 9/2007 |
| WO | WO-2010-150317 A1 | 12/2010 |
| WO | WO-2010-150318 A1 | 12/2010 |

OTHER PUBLICATIONS

PCT/JP2011/002663 Written Opinion dated Jan. 20, 2012.

*Primary Examiner* — Robert Deberadinis
(74) *Attorney, Agent, or Firm* — Arent Fox LLP (57) ABSTRACT

A power transmission device that includes a high-frequency high-voltage generating circuit which applies a high voltage of high frequency between a power transmission device side active electrode and a power transmission device side passive electrode, the power transmission device side passive electrode being disposed in a manner to surround the power transmission device side active electrode and the high-frequency high-voltage generating circuit. An auxiliary high-frequency high-voltage generating circuit is provided between a ground of the power transmission device having a potential substantially equal to the ground potential and the power transmission device side passive electrode. The auxiliary high-frequency high-voltage generating circuit suppresses a potential change of the power reception device side passive electrode relative to the ground potential.

11 Claims, 11 Drawing Sheets

POWER TRANSMISSION DEVICE AND POWER TRANSFER SYSTEM

CROSS REFERENCE TO RELATED APPLICATIONS

The present application is a continuation of International application No. PCT/JP2011/002663, filed May 13, 2011, the entire contents of which is incorporated herein by reference.

FIELD OF THE INVENTION

The present invention relates to a power transmission device and a power transfer system which transfer electric power in a noncontact manner.

BACKGROUND OF THE INVENTION

Patent Document 1 discloses a system configured to transfer electric power through capacitive coupling.

The power transfer system described in Patent Document 1 comprises: a power transmission device including a high-frequency high-voltage generator, a passive electrode, and an active electrode; and a power reception device including a high-frequency high-voltage load, a passive electrode, and an active electrode.

Figure 1:
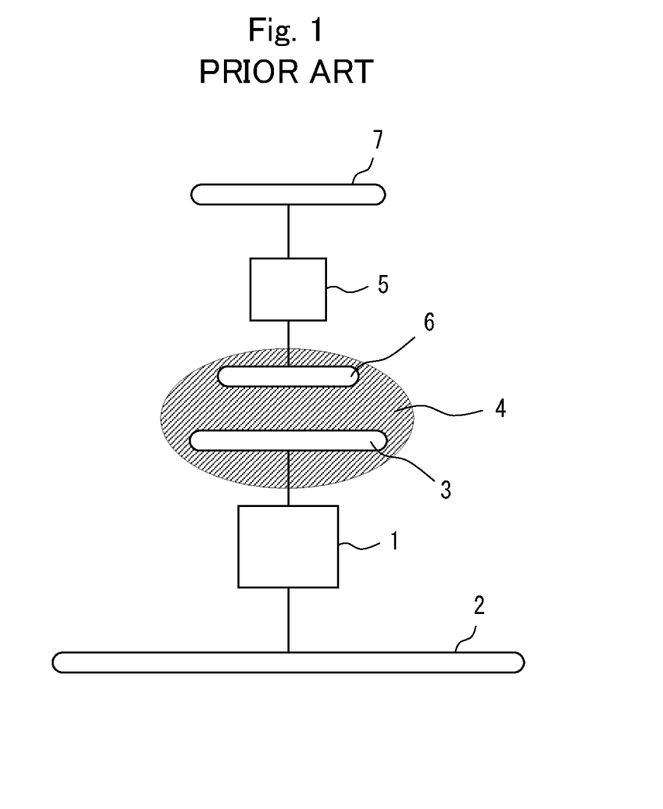
FIG. 1 is a view illustrating the basic configuration of a power transfer system described in Patent Document 1.

FIG. 1 is a view illustrating the basic configuration of the power transfer system of Patent Document 1. The power transmission device includes a high-frequency high-voltage generator 1, a passive electrode 2, and an active electrode 3. The power reception device includes a high-frequency high-voltage load 5, a passive electrode 7, and an active electrode 6. The active electrode 3 of the power transmission device and the active electrode 6 of the power reception device are located in proximity to each other via a gap 4, so that the two electrodes are capacitively coupled to each other.

Patent Document 1: National Publication of International Patent Application No. 2009-531009

SUMMARY OF THE INVENTION

In the power transfer system of the structure described in Patent Document 1, the passive electrodes are located remotely from each other, so that the potential of each passive electrode is undesirably high relative to the ground potential. Particularly when the potential of the passive electrode of the power reception device becomes high, unnecessary electromagnetic field leaks from a dipole formed of the ground (earth) and the passive electrode. In cases where a grounded external body is brought close to the uninsulated passive electrode of the power reception device, a problem arises that corona discharge occurs when the voltage of the passive electrode is excessively high.

Accordingly, it is an object of the present invention to provide a power transmission device and a power transfer system which suppress the leakage of unnecessary electromagnetic field from the passive electrode of the power reception device as well as the occurrence of corona discharge.

A power transmission device according to the present invention includes a power transmission device side active electrode and a power transmission device side passive electrode which are opposed to a power reception device side active electrode and a power reception device side passive electrode, respectively; a high-frequency high-voltage generating circuit configured to apply an alternating voltage of high frequency between the power transmission device side active electrode and the power transmission device side passive electrode; and a potential control section configured to control a potential of the power transmission side passive electrode, wherein the power transmission device side passive electrode is disposed in a manner to surround the power transmission device side active electrode and the high-frequency high-voltage generating circuit.

With this configuration, the potential of the power transmission device side passive electrode can be controlled so as to approximate to the ground potential, thereby making it possible to suppress the leakage of unnecessary electromagnetic field from the power reception device side passive electrode as well as the occurrence of corona discharge.

The potential control section detects, for example, a potential of the power reception device side passive electrode opposed to the power transmission device side passive electrode and controls the potential of the power transmission device side passive electrode based on a result of the detection.

This feature makes it possible to easily approximate the potential of the power reception device side passive electrode to the ground potential.

The potential control section has, for example, a detection electrode which is capacitively coupled to the power reception device side passive electrode opposed to the power transmission device side passive electrode.

This feature makes it possible to detect the potential of the power reception device side passive electrode with a simple configuration.

The potential control section has, for example, an auxiliary high-frequency high-voltage generator which generates a voltage to be applied to the power transmission device side passive electrode.

The power transmission device according to the present invention may be provided with a shield electrode shielding at least one of the power transmission device side passive electrode and the potential control section and connected to a ground of the power transmission device.

This feature makes it possible to suppress the leakage of unnecessary electromagnetic field from the power transmission device also.

A power transfer system according to the present invention comprises the power transmission device of the above-described configuration, and a power reception device, wherein the power reception device includes a load circuit which receives electric power induced between the power reception device side active electrode and the power reception device side passive electrode, while the power reception device side passive electrode is disposed in a manner to surround the power reception device side active electrode and the load circuit.

With this configuration, the potential of the power transmission device side passive electrode can be controlled so as to approximate to the ground potential, thereby making it possible to suppress the leakage of unnecessary electromagnetic field from the power reception device side passive electrode as well as the occurrence of corona discharge due to overvoltage.

The present invention has the following advantageous effects.

The potential of the power transmission device side passive electrode can be controlled so as to approximate to the ground potential, thereby making it possible to suppress the leakage of unnecessary electromagnetic field from the power reception device side passive electrode as well as the occurrence of corona discharge.

By the provision of the shield electrode which shields at least one of the power transmission device side passive electrode and the potential control section and is connected to the ground or a member having a potential substantially equal to the ground potential, the leakage of unnecessary electromagnetic field from the power transmission device can also be suppressed.

DESCRIPTION OF THE PREFERRED EMBODIMENTS

First Embodiment

The configuration of a power transfer system according to a First Embodiment will be described with reference to FIGS. 2 to 5.

Figure 2:
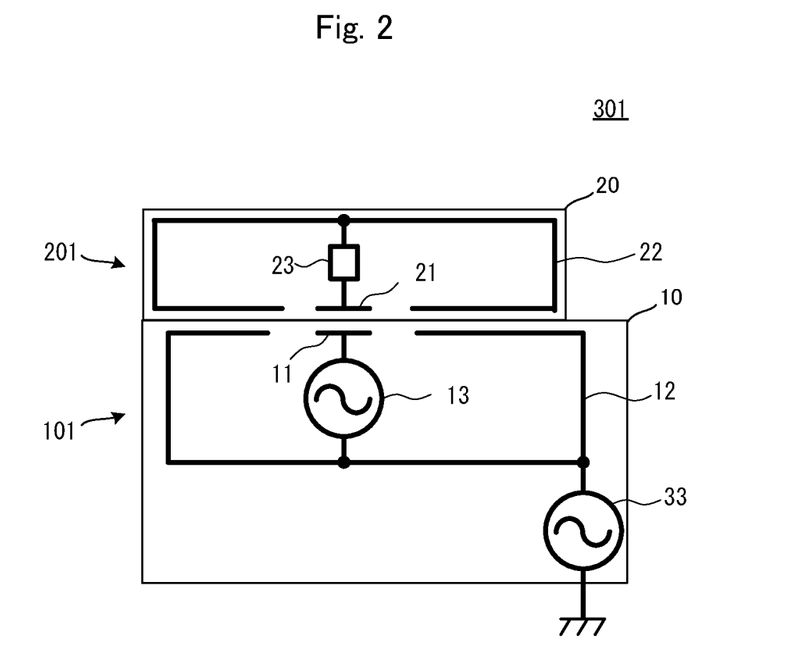
FIG. 2 is a sectional view conceptually illustrating a relevant portion of a power transfer system 301.
Figure 3A:
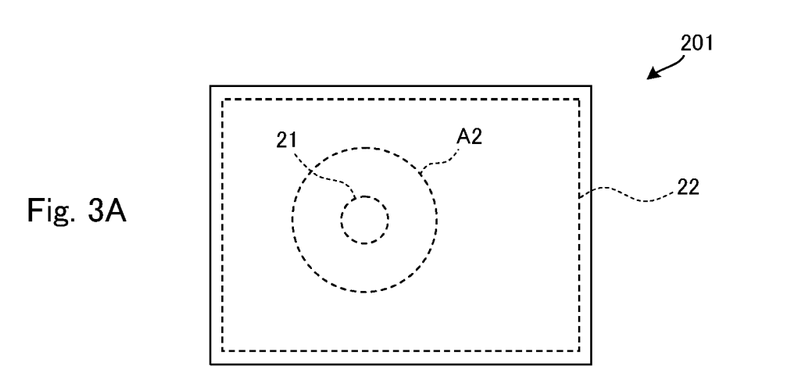
FIG. 3A is a bottom view of a power reception device 201 and FIG. 3B is a top view of a power transmission device 101.
Figure 3B:
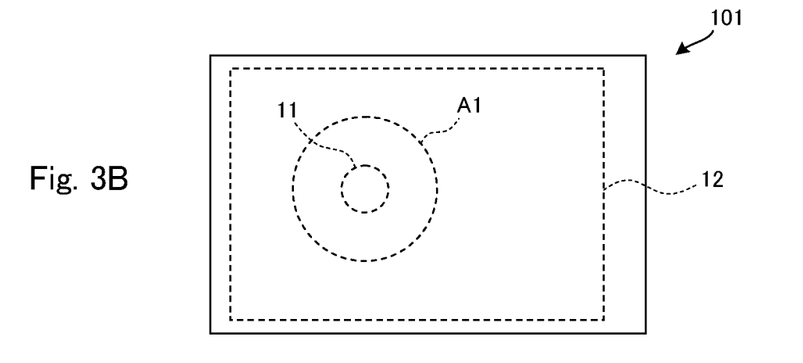

FIG. 2 is a sectional view conceptually illustrating a relevant portion of a power transfer system 301. FIG. 3A is a bottom view of a power reception device 201 and FIG. 3B is a top view of a power transmission device 101.

The power transfer system 301 comprises the power transmission device 101 and the power reception device 201. In proximity to an upper surface of a casing 10 of the power transmission device 101 there are provided a central conductor 11 serving as a power transmission device side active electrode and a peripheral conductor 12 which surrounds the central conductor 11 in a manner isolated therefrom and serves as a power transmission device side passive electrode. Within the casing 10 of the power transmission device 101, a high-frequency high-voltage generating circuit 13 is provided which is configured to apply a high voltage of high frequency between the central conductor 11 and the peripheral conductor 12. The peripheral conductor 12 is disposed along an inner peripheral surface of the casing 10. Therefore, the high-frequency high-voltage generating circuit 13 is covered with the peripheral conductor 12.

The casing 10 of the power transmission device 101 is a molding of a plastic, such as ABS resin for example, and is molded integrally therein with the central conductor 11 and the peripheral conductor 12, so that the casing 10 has an outer surface having an insulating structure.

In proximity to a lower surface of a casing 20 of the power reception device 201 there are provided a central conductor 21 serving as a power reception device side active electrode and a peripheral conductor 22 which surrounds the central conductor 21 in a manner isolated therefrom and serves as a power reception device side passive electrode. Within the casing 20 of the power reception device 201, a load circuit 23 is provided which receives electric power induced between the central conductor 21 and the peripheral conductor 22. In the example illustrated, the peripheral conductor 22 is disposed along an inner peripheral surface of the casing 20. Therefore, the load circuit 23 is covered with the peripheral conductor 22.

The casing 20 of the power reception device 201 is also a molding of a plastic, such as ABS resin for example, and is molded integrally therein with the central conductor 21 and the peripheral conductor 22, so that the casing 20 has an outer surface having an insulating structure.

The central conductor 11 of the power transmission device 101 is shaped circular. The peripheral conductor 12 has a circular opening portion A1 positioned concentrically with the central conductor 11. That is, the peripheral conductor 12 is disposed in a position to surround the central conductor 11 in a manner isolated from the central conductor 11. The central conductor 21 of the power reception device 201 is also shaped circular. The peripheral conductor 22 has a circular opening portion A2 positioned concentrically with the central conductor 21 and is disposed in a position to surround the central conductor 21 in a manner isolated from the central conductor 21.

In the example illustrated, the central conductors 11 and 21 have substantially the same size. The opening portions A1 and A2 of the peripheral conductors have substantially the same size.

As will be described later, by making the area of the opposed surfaces of the peripheral conductors 12 and 22 larger than that of the opposed surfaces of the central conductors 11 and 21 the coupling capacitance between the peripheral conductors 12 and 22 as the passive electrodes can be made relatively larger than the coupling capacitance between the central conductors 11 and 12 as the active electrodes. By so doing, a voltage applied to each peripheral conductor can be lowered according to the ratio between divided voltages obtained by division by capacitances.

When the power reception device 201 is placed relative to the power transmission device 101 so that the central conductor 21 of the power reception device 201 is opposed to the central conductor 11 of the power transmission device 101, the peripheral conductor 12 formed in proximity to the upper surface of the power transmission device 101 faces the peripheral conductor 22 formed in proximity to the lower surface of the power reception device 201.

Surfaces of the respective casings at (near) which the central conductors 11 and 12 are formed are acting surfaces of respective of the power transmission device 101 and the power reception device 201.

A capacitance takes place between the opposed portions of the central conductors 11 and 12 and a capacitance takes place between the peripheral conductors 12 and 22, particularly between the opposed portions of their acting surfaces. That is, the central conductors 11 and 21 and the peripheral conductors 12 and 22 act as capacitively coupled electrodes.

The high-frequency high-voltage generating circuit 13 includes a coil transformer, a piezoelectric transformer, an LC resonant circuit, or the like and is a circuit configured to generate a high voltage having a high frequency of, for example, from 100 kHz to several tens of MHz.

The load circuit 23 includes a high-voltage circuit (including a transformer, a resonant circuit and the like), a rectifying smoothing circuit, and a low-voltage circuit which is operated by an output voltage of the rectifying smoothing circuit. The rectifying and smoothing circuit comprises a diode bridge circuit and a smoothing capacitor. In the case of an alternating load, the alternating load is supplied with an alternating voltage using a step-down transformer, a voltage dividing circuit, or the like which directly lowers an alternating voltage without rectification.

The reference voltage of the peripheral conductor 12 of the power transmission device 101 is the reference voltage (ground potential) of the high-frequency high-voltage generating circuit 13. The reference voltage of the peripheral conductor 22 of the power reception device 201 is the reference voltage (ground potential) of the load circuit 23. Therefore, the central conductors 11 and 21 function as high-voltage side active electrodes, while the peripheral conductors 12 and 22 function as low-voltage side passive electrodes.

An auxiliary high-frequency high-voltage generating circuit 33, which is equivalent to the "potential control section" defined by the present invention, is connected between the peripheral conductor 12 of the power transmission device 101 and a ground of the power transmission device 101.

The auxiliary high-frequency high-voltage generating circuit 33 generates a high voltage synchronously with the high-frequency high-voltage generating circuit 13 and controls the potential of the peripheral conductor 12 of the power transmission device 101 by applying a high-frequency voltage to the peripheral conductor 12 of the power transmission device 101. Since the peripheral conductor 12 of the power transmission device 101 and the peripheral conductor 22 of the power reception device 201 are capacitively coupled to each other, the potential of the peripheral conductor 22 of the power reception device 201 changes with a change in the potential of the peripheral conductor 12 of the power transmission device 101. By utilizing this action the potential of the peripheral conductor 12 of the power transmission device 101 is controlled so as to suppress a change in the potential of the peripheral conductor 22 of the power reception device 201 relative to the ground potential of the power transmission device 101. Usually, the auxiliary high-frequency high-voltage generating circuit 33 generates a high voltage of an opposite phase to that generated by the high-frequency high-voltage generating circuit 13. The auxiliary high-frequency high-voltage generating circuit 33 and the high-frequency high-voltage generating circuit 13 may be formed using a high-frequency high-voltage power source circuit having two output terminals.

When the auxiliary high-frequency high-voltage generating circuit 33 is absent, the potential of the peripheral conductor 22 is varied particularly by capacitive coupling between the central conductor 11 of the power transmission device 101 and the peripheral conductor 22 of the power reception device 201. However, the voltage generated by the auxiliary high-frequency high-voltage generating circuit 33 acts in such a direction as to cancel such a variation and, hence, the potential of the peripheral conductor 22 of the power reception device 201 is virtually grounded.

Thus, it is possible to suppress the leakage of unnecessary electromagnetic field from the peripheral conductor 22 as the power reception device 201 side passive electrode as well as the occurrence of corona discharge.

The basic principle of the power transfer system according to the present invention is short-range energy transfer using an alternative electromagnetic field (quasi-static electric/magnetic field). When a wavelength (lambda) is sufficiently longer than the size or operating range (distance d) of an electric field oscillating source, that is, when the relationship:

$$d/(\text{lambda}) \ll 1$$

is satisfied, a quasi-static electric field stays (is bound) near the electric field oscillating source. Thus, a radiant quantity to a distant place is negligibly small.

Note that electromagnetic waves have transverse modes (namely, both electric and magnetic fields are perpendicular to the direction of propagation), whereas in a power transfer method using a quasi-static electric field according to the present invention energy is transferred in the same direction as an electric field. In a low-frequency band in which a quasi-static electric field is handled, the formula "Z=V/I" is available ("Z" is an impedance, "V" is a voltage, and "I" is a current).

Figure 4:
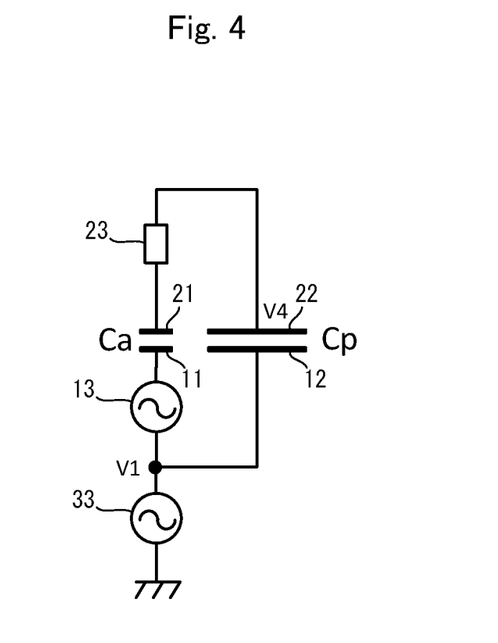
FIG. 4 is an equivalent circuit diagram of the power transfer system 301.

FIG. 4 is an equivalent circuit diagram of the power transfer system 301. For simplicity, capacitive coupling portions are represented as two series capacitances. As shown in FIG. 4, a source side dipole is formed of the central conductor 11 as the power transmission device side active electrode, the peripheral conductor 12 as the power transmission device side passive electrode, and the high-frequency high-voltage generating circuit 13. Likewise, a load side dipole is formed of the central conductor 21 as the power reception device side active electrode, the peripheral conductor 22 as the power reception device side passive electrode, and the load circuit 23.

The auxiliary high-frequency high-voltage generating circuit 33 controls its voltage V1 so that the voltage V4 of the peripheral conductor 22 forming the passive electrode of the load side dipole assumes zero.

Specifically, the auxiliary high-frequency high-voltage generating circuit 33 is simply caused to generate the voltage V1 represented by the following expression synchronously (in-phase) with the voltage generated by the high-frequency high-voltage generating circuit 13. This expression can be derived from conditions for the potential V4 to assume zero.

$$\text{Re}(V_1) = \frac{C_p(C_a + C_p) + (\omega C_a C_p R)^2}{(C_p + C_a)^2 + (\omega C_a C_p R)^2} - 1,$$

$$\text{Im}(V_1) = \frac{\omega C_p C_a^2 R}{(C_p + C_a)^2 + (\omega C_a C_p R)^2} \dots$$

Figure 5:
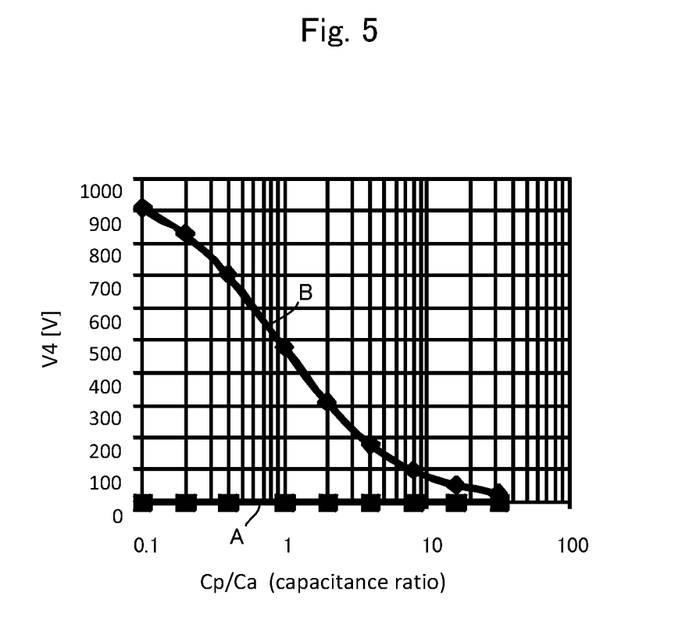
FIG. 5 is a chart plotting results obtained by calculating the magnitude of a potential V4 of a load side passive electrode under a condition controlled or not controlled by an auxiliary high-frequency high-voltage generating circuit 33.

FIG. 5 plots results obtained by calculating the magnitude of the potential V4 of the load side passive electrode under a condition controlled or not controlled by the auxiliary high-frequency high-voltage generating circuit 33. Here, Cp represents the capacitance between the passive electrodes, Ca represents the capacitance between the active electrodes, the abscissa takes on Cp/Ca, and the ordinate takes on the potential V4 of the load side passive electrode. In FIG. 5, characteristic curve A depicts the potential controlled by the auxiliary high-frequency high-voltage generating circuit 33 and characteristic curve B depicts the potential not controlled.

The conditions used in the calculation are as follows:
Operating frequency: 100 [kHz]
Ca: 10 [pF]
Cp: 20 [pF]
Input voltage: 1 [kV]
Load resistance: 100 [kohm]

As can be seen from FIG. 5, the potential V4 of the load side passive electrode lowers as the capacitance ratio Cp/Ca increases. Also, the potential V4 can be set to zero regardless of the capacitance ratio Cp/Ca by controlling the auxiliary high-frequency high-voltage generating circuit 33.

In this way, the potential of the passive electrode (peripheral conductor 22) of the power reception device 201 can be controlled from the power transmission device 101 side. Since the control is performed to cause the potential of the passive electrode of the power reception device 201 to assume the ground potential, the leakage of unnecessary electromagnetic field from the passive electrode of the power reception device 201 can be reduced. It is also possible to shield the active electrode (central conductor 11) of the power transmission device 101 and the active electrode (central conductor 21) of the power reception device 201 with the passive electrode (peripheral conductor 12) of the power transmission device 101 and the passive electrode (peripheral conductor 22) of the power transmission device 201. Further, since it is possible to lower the potential of the passive electrode (peripheral conductor 22) of the power reception device 201, corona discharge can be suppressed. That is, it is possible to increase the electric energy that can be transferred, with measures being taken against unnecessary noise.

Since each central conductor and the portion of the peripheral conductor paired therewith which extends at the associated acting surface are formed in substantially the same plane, the central conductors 11 and 21 and the peripheral conductors 12 and 22 can be easily formed at the acting surfaces, thus making it possible to render the gap between opposite electrodes constant and stabilize the power transfer characteristics.

Second Embodiment

Figure 6:
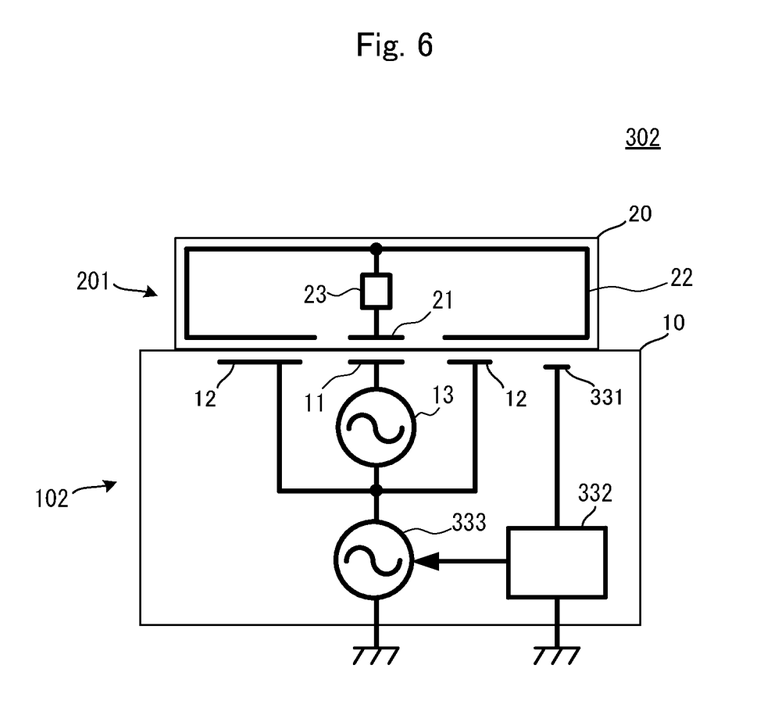
FIG. 6 is a sectional view conceptually illustrating a relevant portion of a power transfer system 302 according to a Second Embodiment.

FIG. 6 is a sectional view conceptually illustrating a relevant portion of a power transfer system 302 according to a Second Embodiment. The power transfer system 302 comprises a power transmission device 102 and the power reception device 201.

The power reception device 201 has the same configuration as the power reception device 201 shown in FIG. 2 and includes the central conductor 21, peripheral conductor 22 and load circuit 23 within the casing 20.

In proximity to an upper surface of the casing 10 of the power transmission device 102 there are provided the central conductor 11 serving as a power transmission device side active electrode and the peripheral conductor 12 which surrounds the central conductor 11 in a manner isolated therefrom and serves as a power transmission device side passive electrode. Within the casing 10 of the power transmission device 102, the high-frequency high-voltage generating circuit 13 is provided which is configured to apply a high voltage of high frequency between the central conductor 11 and the peripheral conductor 12.

A detection electrode 331 is provided in proximity to an upper surface of the casing 10 of the power transmission device 102 so as to face the peripheral conductor 22 of the power reception device 201. An auxiliary high-frequency high-voltage generator 333 and a voltage control circuit 332 are provided inside the power transmission device 102. The detection electrode 331 is capacitively coupled to the peripheral conductor 22 of the power reception device 201. The voltage control circuit 332 detects the potential of the peripheral conductor 22 of the power reception device 201 by way of the potential of the detection electrode 331. The voltage control circuit 332 also controls the auxiliary high-frequency high-voltage generator 333 according to the potential of the peripheral conductor 22 of the power reception device 201.

In the First Embodiment, the auxiliary high-frequency high-voltage generating circuit 33 generates a fixed voltage such as to make the potential of the peripheral conductor 22 of the power reception device 210 equivalently equal to the ground potential of the power transmission device 102. In the Second Embodiment, by detecting the potential of the peripheral conductor 22 of the power reception device 201 which is the subject to be controlled, the voltage generated by the auxiliary high-frequency high-voltage generator 333 is feedback-controlled so that the potential of concern becomes equivalently equal to the ground potential of the power transmission device 102.

The auxiliary high-frequency high-voltage generator 333 generates a high voltage synchronously with the high-frequency high-voltage generating circuit 13 and applies a high-frequency voltage to the peripheral conductor 12 of the power transmission device 102, thereby controlling the potential of the peripheral conductor 12 of the power transmission device 102. Since the peripheral conductor 12 of the power transmission device 102 and the peripheral conductor 22 of the power reception device 201 are capacitively coupled to each other, the potential of the peripheral conductor 22 of the power reception device 201 changes with a change in the potential of the peripheral conductor 12 of the power transmission device 102. By utilizing this action the potential of the peripheral conductor 12 of the power transmission device 102 is controlled so as to suppress a change in the potential of the peripheral conductor 22 of the power reception device 201 relative to the ground potential of the power transmission device 102.

Usually, the auxiliary high-frequency high-voltage generator 333 generates a voltage that is different in voltage value (amplitude) from that generated by the high-frequency high-voltage generating circuit 13. These voltages may have the same polarity. A power source circuit for the auxiliary high-frequency high-voltage generator 333 and a power source circuit for the high-frequency high-voltage generating circuit 13 may be formed using a high-frequency high-voltage power source circuit having two output terminals.

The capacitance which takes place between opposite electrodes respectively belonging to the power transmission device 102 and the power reception device 201 changes depending on the size of the power reception device and the manner of placement of the power reception device relative to the power transmission device. Therefore, the potential of the peripheral conductor 22 of the power reception device 201 changes depending on the size of the power reception device and the manner of placement of the power reception device relative to the power transmission device. According to the Second Embodiment, however, the feedback control makes it possible to more stably and constantly render the potential of the peripheral conductor 22 of the power reception device 201 substantially equal to the ground potential of the power transmission device equivalently.

Third Embodiment

Figure 7:
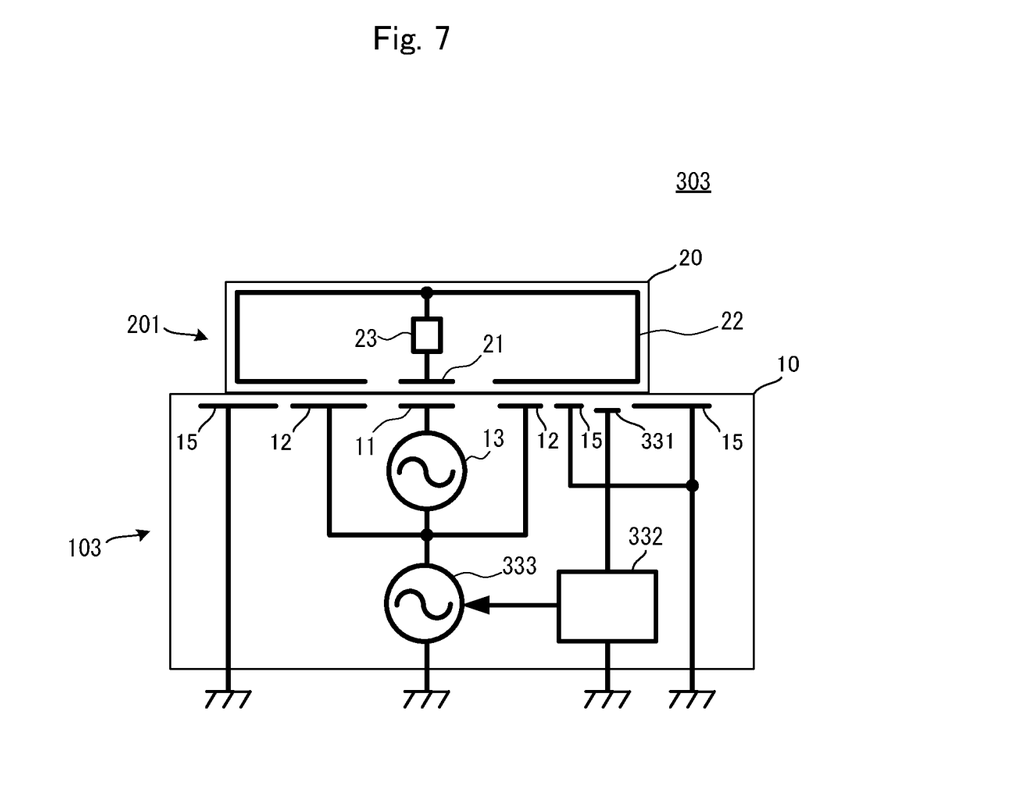
FIG. 7 is a sectional view conceptually illustrating a relevant portion of a power transfer system 303 according to a Third Embodiment.

FIG. 7 is a sectional view conceptually illustrating a relevant portion of a power transfer system 303 according to a Third Embodiment. The power transfer system 303 comprises a power transmission device 103 and the power reception device 201.

The power reception device 201 has the same configuration as the power reception device 201 shown in FIG. 2 and includes the central conductor 21, peripheral conductor 22 and load circuit 23 within the casing 20.

A guard electrode 15, which is equivalent to the "shield electrode" defined by the present invention, is provided in proximity to an upper surface of the casing 10 of the power transmission device 103. The guard electrode 15 is shaped to surround the peripheral conductor 12 serving as a power transmission device 103 side passive electrode and has a potential set to the ground potential. The guard electrode 15 is located near the peripheral conductor 22 serving as a power reception device 201 side passive electrode and is capacitively coupled thereto partially. Since the guard electrode 15 is capacitively coupled to the peripheral conductor 22, the potential of the peripheral conductor 22 can be brought closer to the ground potential. The detection electrode 331 is surrounded with the guard electrode 15. This structure prevents a capacitance from taking place between the detection electrode 331 and the peripheral conductor 12 of the power transmission device 103 and, hence, the detection electrode 331 is free from the effect of the potential of the peripheral conductor 12. The guard electrode 15 need not necessarily surround the entire circumference of the peripheral conductor 12 as the power transmission device 103 side passive electrode and may be partially formed with a slit-like gap for example.

The basic operation of the Third Embodiment is similar to that of the Second Embodiment. The voltage control circuit 332 detects the potential of the peripheral conductor 22 of the power reception device 201 by way of the potential of the detection electrode 331 and controls the auxiliary high-frequency high-voltage generator 333 so that the potential of the peripheral conductor 22 becomes equivalently equal to the ground potential.

Fourth Embodiment

Figure 8:
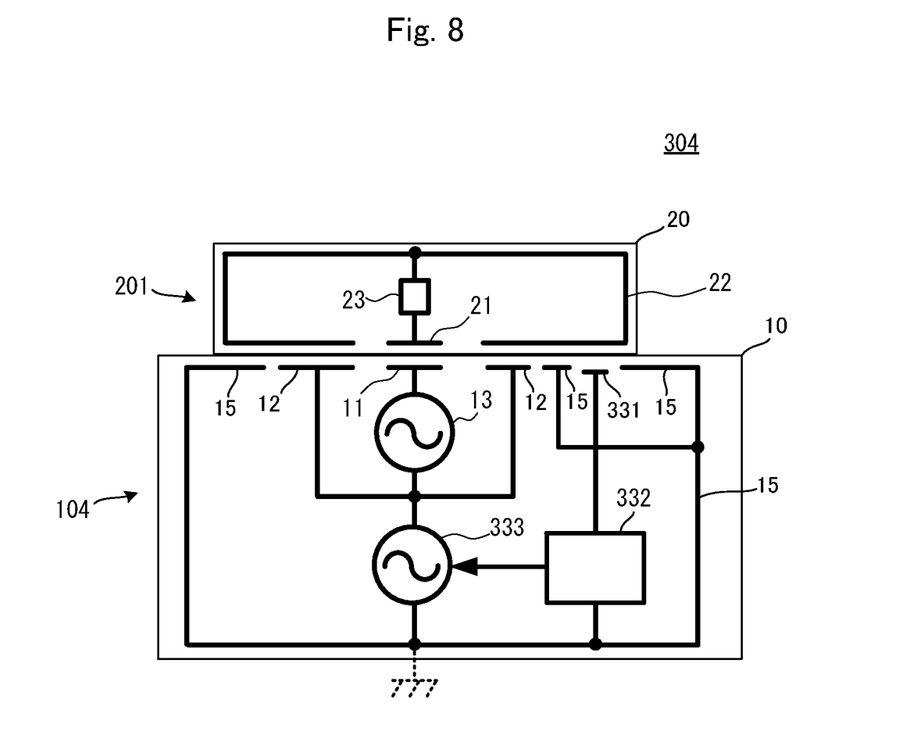
FIG. 8 is a sectional view conceptually illustrating a relevant portion of a power transfer system 304 according to a Fourth Embodiment.

FIG. 8 is a sectional view conceptually illustrating a relevant portion of a power transfer system 304 according to a Fourth Embodiment. The power transfer system 304 comprises a power transmission device 104 and the power reception device 201.

The power reception device 201 has the same configuration as the power reception device 201 shown in FIG. 2 and includes the central conductor 21, peripheral conductor 22 and load circuit 23 within the casing 20.

Unlike the power transfer system of FIG. 7 according to the Third Embodiment, the guard electrode 15 of the power transmission device 104 surrounds the peripheral conductor 12 as a power transmission device side passive electrode, the voltage control circuit 332 and the auxiliary high-frequency high-voltage generator 333. The guard electrode 15 serves as a ground of the casing. The ground of the casing may be connected to a ground electrode of a commercial power source.

This structure not only prevents the detection electrode 331 from being interfered with by the peripheral conductor 12 of the power transmission device 104 but also suppresses the leakage of unnecessary electromagnetic field from the power transmission device 104.

Fifth Embodiment

Figure 9:
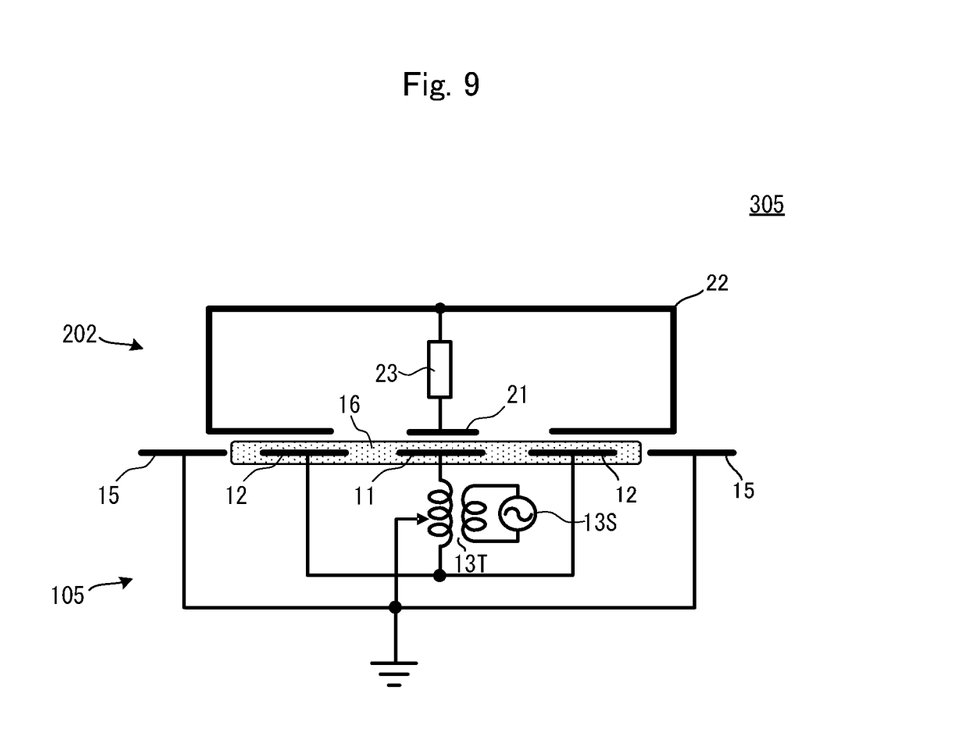
FIG. 9 is a sectional view conceptually illustrating a relevant portion of a power transfer system 305 according to a Fifth Embodiment.

FIG. 9 is a sectional view conceptually illustrating a relevant portion of a power transfer system 305 according to a Fifth Embodiment. The power transfer system 305 comprises a power transmission device 105 and a power reception device 202. The power transmission device 105 has an upper surface provided with the central conductor 11 serving as a power transmission device side active electrode and the peripheral conductor 12 which surrounds the central conductor 11 in a manner isolated therefrom and serves as a power transmission device side passive electrode. The guard electrode 15, which is equivalent to the "shield electrode" defined by the present invention, is disposed in proximity to the upper surface of the power transmission device 105. The guard electrode 15 is grounded virtually. Within the power transmission device 105 the secondary coil of a step-up transformer 13T interconnects the central conductor 11 and the peripheral conductor 12. The primary coil of the step-up transformer 13T is connected to a high-frequency high-voltage generating circuit 13S. The central conductor 11 and the peripheral conductor 12 are coated with an insulating material 16.

In proximity to a lower surface of the power reception device 202 there are provided the central conductor 21 serving as a power reception device side active electrode and the peripheral conductor 22 which surrounds the central conductor 21 in a manner isolated therefrom and serves as a power reception device side passive electrode. The load circuit 23 is provided which receives electric power induced between the central conductor 21 and the peripheral conductor 22 of the power reception device 202.

A circuit portion comprising the secondary coil of the step-up transformer 13T and a tap interconnecting the secondary coil and the guard electrode 15 is equivalent to the "potential control section" defined by the present invention.

The Fifth Embodiment is capable of generating an application voltage relative to the ground potential of the power transmission device 105 which is to be applied to the power transmission device side passive electrode (peripheral conductor 12) by fixing a ground point of the secondary coil of the step-up transformer 13T. That is, the high-frequency high-voltage generating circuit and the auxiliary high-frequency high-voltage generator can be formed using a single power source.

Though the central conductor 11 serving as the power transmission device side active electrode and the peripheral conductor 12 serving as the power transmission device side passive electrode need to be protected by insulation, the guard electrode 15, which is grounded virtually, assumes substantially the earth potential. For this reason, the guard electrode 15 does not need to be protected by insulation.

Sixth Embodiment

Figure 10:
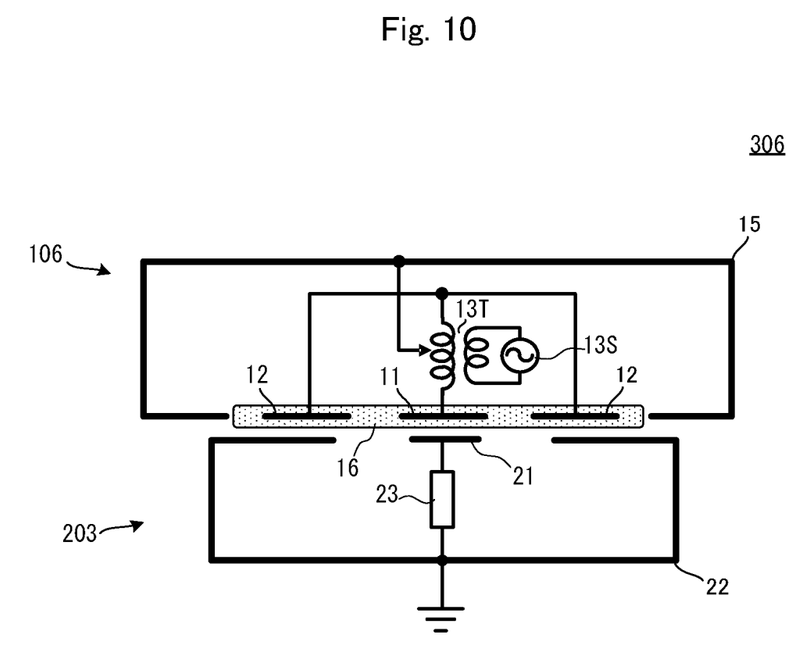
FIG. 10 is a sectional view conceptually illustrating a relevant portion of a power transfer system 306 according to a Sixth Embodiment.

FIG. 10 is a sectional view conceptually illustrating a relevant portion of a power transfer system 306 according to a Sixth Embodiment. The power transfer system 306 comprises a power transmission device 106 and a power reception device 203. The power transmission device 106 has a lower surface provided with the central conductor 11 serving as a power transmission device side active electrode and the peripheral conductor 12 which surrounds the central conductor 11 in a manner isolated therefrom and serves as a power transmission device side passive electrode.

The guard electrode 15, which shields the peripheral conductor 12, is disposed to surround the power transmission device 106. The guard electrode 15 is connected to a virtual ground of the power transmission device 106. Within the power transmission device 106 the secondary coil of the step-up transformer 13T interconnects the central conductor 11 and the peripheral conductor 12. The high-frequency high-voltage generating circuit 13S is connected to the primary coil of the step-up transformer 13T. The central conductor 11 and the peripheral conductor 12 are coated with the insulating material 16.

In proximity to an upper surface of the power reception device 203 there are provided the central conductor 21 serving as a power reception device side active electrode and the peripheral conductor 22 which surrounds the central conductor 21 in a manner isolated therefrom and serves as a power reception device side passive electrode. The load circuit 23 is provided which receives electric power induced between the central conductor 21 and the peripheral conductor 22 of the power reception device 203.

A circuit portion comprising the secondary coil of the step-up transformer 13T and a tap interconnecting the secondary coil and the guard electrode 15 is equivalent to the "potential control section" defined by the present invention.

The power transmission device 106 is for use as a battery-driven portable power source. The potential of the guard electrode (casing) 15 is stabilized by connecting the guard electrode 15 of the power transmission device 106 to a virtual circuit ground (=earth potential) point. For this reason, it is possible to suppress the occurrence and leakage of unnecessary electromagnetic field.

Though the central conductor 11 serving as the power transmission device side active electrode and the peripheral conductor 12 serving as the power transmission device side passive electrode need to be protected by insulation, the guard electrode 15, which is grounded virtually, assumes substantially the earth potential, as in the Fifth Embodiment. For this reason, the guard electrode 15 does not need to be protected by insulation.

Seventh Embodiment

Figure 11:
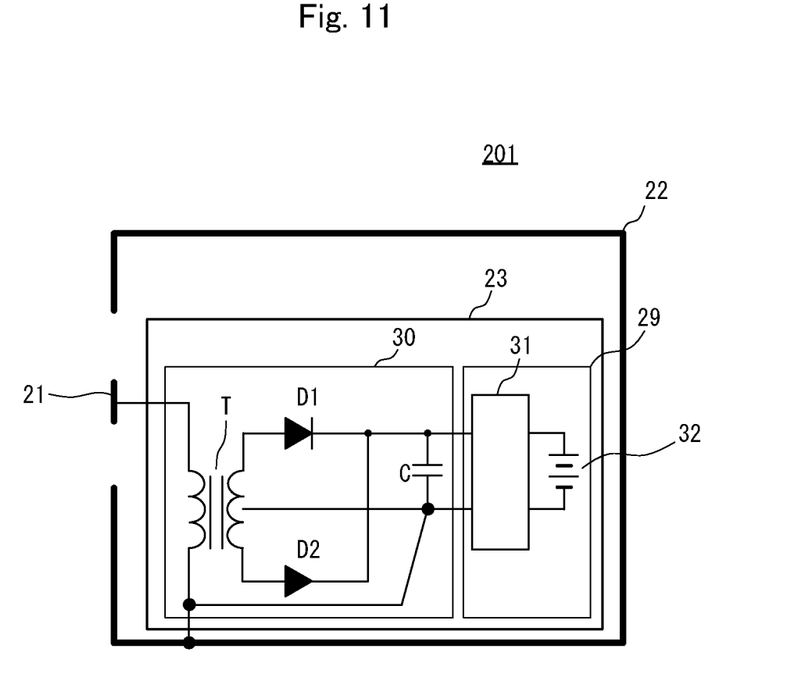
FIG. 11 is a circuit diagram of a power reception device 201 according to a Seventh Embodiment.

A Seventh Embodiment is directed to a specific example of the load circuit 23 provided inside the power reception device 201 in any one of the Embodiments described above. FIG. 11 is a circuit diagram of the power reception device 201 according to the Seventh Embodiment.

The load circuit 23 includes a rectifying smoothing circuit 30 and a low-voltage circuit portion 29. The rectifying smoothing circuit 30 includes a step-down transformer T, rectifying diodes D1 and D2, and a smoothing capacitor C. The primary coil of the transformer T has one end connected to the central conductor 21 and an opposite end connected to the peripheral conductor 22 as a ground of a metal frame. The secondary coil of the transformer T is formed with a full-wave rectifying circuit comprising the rectifying diodes D1 and D2 and the smoothing capacitor C. The rectifying smoothing circuit 30 may include a resonance circuit. Alternatively, such a resonance circuit may be provided before or after the rectifying smoothing circuit 30.

In this example, the power reception device 201 forms a noncontact charging device and the low-voltage circuit portion 29 includes a control circuit 31 operated by a voltage rectified and smoothed by the rectifying smoothing circuit 30 that serves as a power source, and a secondary battery 32. The control circuit 31 performs a charging control for the secondary battery 32, a charging control using the secondary battery 32 as a power source, and other predetermined circuit operations.

Other Embodiments

In each of the Second to Seventh Embodiments described above, the voltage value (amplitude) of a voltage generated by the auxiliary high-frequency high-voltage generator 333 relative to a voltage generated by the high-frequency high-voltage generating circuit 13 is a subject to be controlled. However, the phase of a voltage generated by the auxiliary high-frequency high-voltage generator 333 may also be a subject to be controlled. Specifically, a feedback control may be performed so that the potential of the peripheral conductor 22 of the power reception device 201 becomes equivalently equal to the ground potential of the power transmission device 201 by controlling the voltage value and the phase of a voltage generated by the auxiliary high-frequency high-voltage generator 333. For this purpose, the phase of a waveform representing a potential change of the peripheral conductor 22 of the power reception device 201 is detected and a control is performed so as to minimize the amplitude of the potential change of the peripheral conductor 22 of the power reception device 201. This configuration is capable of suppressing the potential change of the peripheral conductor 22 of the power reception device 201 even when there is a phase difference between the potential change of the peripheral conductor 22 of the power reception device 201 and a voltage change of the high-frequency high-voltage generating circuit 13.

While each of the foregoing Embodiments is directed to an example in which the peripheral conductor 12 serving as the power transmission device side passive electrode surrounds the central conductor 11 serving as the power transmission device side active electrode, the peripheral conductor 12 need not necessarily surround the central conductor 11. Likewise, the peripheral conductor 22 serving as the power reception device side passive electrode need not necessarily surround the central conductor 21 serving as the power reception device side passive electrode. For example, an active electrode and a passive electrode need not necessarily be formed in the same plane. Thus, it is possible that the active electrode is formed in front of the passive electrode or the passive electrode is formed in front of the active electrode. That is, it is sufficient that the passive electrode is present in the periphery of the active electrode while the power transmission device side active electrode is opposed to the power reception device side active electrode and the power transmission device side passive electrode opposed to the power reception device side passive electrode.

REFERENCE SIGNS LIST

A1, A2 ... opening portion of peripheral conductor
10 ... casing of power transmission device
11 ... central conductor (power transmission device side active electrode)
12 ... peripheral conductor (power transmission device side passive electrode)
13 ... high-frequency high-voltage generating circuit
15 ... guard electrode
16 ... insulating material
20 ... casing of power reception device
21 ... central conductor (power reception device side active electrode)
22 ... peripheral conductor (power reception device side passive electrode)
23 ... load circuit
29 ... low-voltage circuit portion
30 ... rectifying smoothing circuit
31 ... control circuit
32 ... secondary battery
33 ... auxiliary high-frequency high-voltage generating circuit
101 to 106 ... power transmission device
201 to 203 ... power reception device
301 to 306 ... power transfer system
331 ... detection electrode
332 ... voltage control circuit
333 ... auxiliary high-frequency high-voltage generator

The invention claimed is:

1. A power transmission device comprising:
   a power transmission device side active electrode;
   a power transmission device side passive electrode;
   a high-frequency high-voltage generating circuit configured to apply a high voltage of high frequency between the power transmission device side active electrode and the power transmission device side passive electrode; and
   a potential control section configured to control a potential of the power transmission device side passive electrode, wherein
   the power transmission device side passive electrode surrounds the power transmission device side active electrode and the high-frequency high-voltage generating circuit.

2. The power transmission device according to claim 1, wherein the potential control section detects a potential of a power reception device side passive electrode opposing the power transmission device side passive electrode, and controls a potential of the power transmission device side passive electrode based on a result of the detection.

3. The power transmission device according to claim 2, wherein the potential control section has a detection electrode which is capacitively coupled to a power reception device side passive electrode opposed to the power transmission device side passive electrode.

4. The power transmission device according to claim 1, wherein the potential control section has an auxiliary high-frequency high-voltage generator which generates a voltage to be applied between the power transmission device side passive electrode and a ground of the power transmission device.

5. The power transmission device according to claim 4, wherein the auxiliary high-frequency high-voltage generator generates the voltage synchronously with the high-frequency high-voltage generating circuit.

6. The power transmission device according to claim 4, wherein the potential control section further comprises:
   a detection electrode; and
   a voltage control circuit configured to detect a potential of a power reception device side passive electrode via the detection electrode and control the auxiliary high-frequency high-voltage generator based on a result of the detection.

7. The power transmission device according to claim 6, further comprising a shield electrode arranged so as to shield at least one of the power transmission side passive electrode and the potential control section, and which is connected to a ground of the power transmission device.

8. The power transmission device according to claim 1, further comprising a shield electrode arranged so as to shield at least one of the power transmission side passive electrode and the potential control section, and which is connected to a ground of the power transmission device.

9. The power transmission device according to claim 8, wherein the shield electrode is arranged so as to face a power reception device side passive electrode opposed to the power transmission device side passive electrode.

10. The power transmission device according to claim 1, wherein the power transmission device side passive electrode is coated with an insulating film.

11. A power transfer system comprising:
    the power transmission device according to claim 1; and
    a power reception device, wherein the power reception device includes:
    a power reception device side active electrode;
    a power reception device side passive electrode; and
    a load circuit which receives electric power induced between the power reception device side active electrode and the power reception device side passive electrode when the power reception device side passive electrode surrounds the power reception device side active electrode and the load circuit.

* * * * *